United States Patent

Scalco

[11] 3,976,563
[45] Aug. 24, 1976

[54] DRY RECLAMATION OF WIRE SCRAP

[75] Inventor: Emanuele Scalco, Bridgewater Township, Somerset County, N.J.

[73] Assignee: Bell Telephone Laboratories, Incorporated, Murray Hill, N.J.

[22] Filed: Mar. 7, 1975

[21] Appl. No.: 556,225

[52] U.S. Cl. .................... 209/3; 209/11; 260/2.3
[51] Int. Cl.² ............... B03B 1/02; B29C 29/00; C22B 15/00
[58] Field of Search ........... 209/2, 3, 11, 466–469, 209/474–476; 29/403; 241/27, 17, 23; 264/DIG. 51; 427/120

[56] References Cited
UNITED STATES PATENTS

| | | |
|---|---|---|
| 2,938,233 | 5/1960 | Nack et al. ............... 264/DIG. 51 |
| 3,074,653 | 1/1963 | Schorsch ............................. 241/14 |
| 3,349,912 | 10/1967 | Eveson et al. ..................... 209/11 X |
| 3,579,379 | 5/1971 | Van Berkel et al. ............... 427/120 |
| 3,646,248 | 2/1972 | Ling et al. ..................... 427/120 X |
| 3,670,969 | 6/1972 | Terada .............................. 241/27 |
| 3,802,913 | 4/1974 | MacKenzie .................... 427/120 X |
| 3,804,250 | 4/1974 | Dankesreiter ................... 209/11 X |

*Primary Examiner*—Frank W. Lutter
*Assistant Examiner*—Ralph J. Hill
*Attorney, Agent, or Firm*—P. V. D. Wilde

[57] ABSTRACT

A method for recovering plastic from plastic insulated wire scrap involving separating the plastic from short segments of the wire by agitating the segments in a heated dry powder medium until the metal is released from the plastic insulation, separating the metal from the plastic insulation leaving at least 0.5% by weight of the powder intermixed with the plastic insulation.

9 Claims, 4 Drawing Figures

DRY RECLAMATION OF WIRE SCRAP

BACKGROUND OF THE INVENTION

The urgency of preserving our resources and our environment has stimulated intense efforts toward recycling manufactured products. Giving added impetus to these efforts are spiralling material costs and raw material shortages. Reclaiming some of these materials was once prohibitive economically, but now, in many cases, it is an attractive business.

A manufactured product that qualifies as prime candidate for new reclamation efforts is electrical wire and cable. The value of both copper and plastic insulation has increased sharply. Until recently, the copper content of some scrap wire and cable was reclaimed by burning away the plastic insulation. This practice has been terminated because of environmental considerations. Moreover, the plastic material has now enough intrinsic value to justify efforts to reclaim it as well as the copper.

Various methods of wire reclamation have been tried. These typically follow one of two general approaches. One of these is to chemically treat the scrap to dissolve one of the materials, ordinarily the insulation, leaving the other to be simply strained from the solution and dried. If the plastic insulation is dissolved, it can be reclaimed by chemical separation from the solvent.

The other approach is more mechanical in nature and relies on the difference in physical characteristics of the wire conductor and the insulation. The wire is cut into short lengths and mechanically agitated to free each metal wire segment from its insulation. The metal and plastic are then separated by a standard method such as flotation or gravity separation. An example of this technique is described and claimed in U.S. Pat. No. 3,670,969, issued June 20, 1972.

Interest continues in both of these kinds of reclamation processes. The solvent process is capable of recovering plastic in very pure form regardless of the mix of materials existing in the scrap. The mechanical process yields a mixture of polymers and plastisizers, the composition of which is normally controlled by first sorting the scrap. However, the mechanical kind of process is simpler and may prove to be less expensive.

This invention is an improvement of the mechanical separation method of U.S. Pat. No. 3,670,969. That method involves loading short segments of wire into a heated liquid medium and agitating the medium to release the metal from the plastic insulation. The technique appears to be based on empirical observations. The precise mechanics of the separation process are not apparent from the teachings of the patent. Those skilled in the art have speculated that a combination of the shearing forces of the agitated liquid medium on the wire seqments and of multiple impacts between wire segments and between the segments and the agitating hardware separates the metal from the plastic insulation.

It seems certain that the heated liquid plays an important role in heating the wire segments and that the heat facilitates separation. A possible explanation of the effect of heating is that it acts on the plastic insulation to allow extrusion strains in the plastic to relieve themselves, shrinking the insulation lengthwise and simultaneously increasing its diameters. This loosens the grip of the plastic on the conductor, so that the conductor can then be shaken or impacted out of the expanded segment of insulation, provided no sticking occurs. It is theorized that the liquid medium helps prevent sticking, as well as being an effective heat transfer medium for heating the scrap segments. As noted above, it also provides a mechanical medium for transmitting shearing forces and multiple impacts to the wire segments.

The foregoing explanation is a generalized opinion of how the prior art process operates. There is no quantitative theory available by which the effect of modifications in the prior art process can be predicted.

SUMMARY OF THE INVENTION

A significant modification of the patented process has been demonstrated as effective for wire and cable reclamation and has been shown to have important advantages. According to this modification a solid separating medium is used in place of the liquid medium of the prior art. The solid separating medium is preferably a finely powdered solid. It can be chosen from a variety of powdered materials that are compatible with the reconstituted plastic product so that complete filtering of the powder from the reclaimed plastic is unnecessary. The powder can also be one of a variety of actual ingredients of the reconstituted plastic such as a filler, or it can be the powdered plastic itself.

The choice of a dry powder over a liquid has other advantages. It allows the temperature to which the medium and scrap are heated to exceed the typical boiling point of the liquid. The temperature that is optimum in terms of the effectiveness of the separation process has been found in many instances to exceed 100°C, the maximum temperature allowed in the specific embodiment of the prior patent. A separation process using the dry medium appears to be very effective in terms of processing time, and is capable of reclaiming relatively long segments of wire.

Whereas the overall process described here is aimed at separating metal from its associated plastic covering, the separation actually occurs in two stages. The first, and most difficult, is referred to here as the liberation stage in which the metal conductor is released from its plastic sleeve, leaving a mixture of metal and plastic. This mixture is then classified by any of a variety of known methods, such as flotation or gravity separation, to separate the mixture of metal and plastic. The latter step is regarded by those in the art as conventional and it is not the purpose of this description to detail that aspect of the process.

Whereas the separation, as just described, occurs in two identifiable stages, it is foreseeable that one might prefer to have both stages integrated into essentially a single unit operation. For example, the separation method of U.S. Pat. No. 3,670,969 can employ, as the liquid medium for liberation, a liquid effective for flotation separation of the liberated materials.

DETAILED DESCRIPTION OF THE INVENTION

Figure 1A:
FIGS. 1A, 1B, and 1C illustrate the mechanism by which the metal conductor in a segment of electrical wire can be liberated from the plastic insulation using the technique of the invention.
Figure 1B:
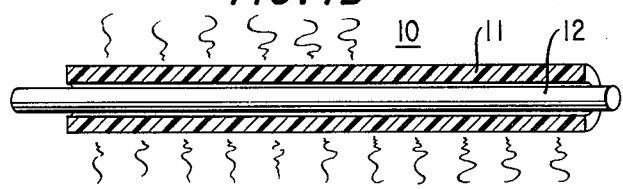
Figure 1C:

The mechanical action of the separation of the metal conductor of electrical wire from its plastic insulation is illustrated by FIGS. 1A, 1B and 1C. The wire 10 consists of metal conductor 11 and plastic insulation 12. Upon application of heat to the wire (FIG. 2), the elastic strain memory that was induced during extrusion of the plastic wire insulation is relieved in the softened material by contraction of the sleeve. There are two significant consequences of this. The one believed to be most important is that, as the sleeve shrinks in the longitudinal dimension, it expands away from the wire and the wire is then retained only loosely in the plastic sleeve. Secondly, the ends of the wire are now exposed to mechanical impacts to initiate the release of the wire from the sleeve. Any force or impact that occurs then, on either the wire or the sleeve, in the direction indicated by the arrows of FIG. 1C will aid in completing the separation.

The role of the medium in which the agitation occurs has not been conclusively established. It is known that it serves as a heat transfer medium to supply the heat necessary to shrink the plastic, and it serves as a mechanical translating medium by which the segments are moved continually and exposed to the kind of mechanical forces indicated in FIG. 1C. It also prevents sticking between the softened plastic of the heated wire segments. It is believed to penetrate between the metal conductor and the insulation as the plastic shrinks away from the conductor, thus promoting liberation of the metal by preventing it from sticking within the plastic.

Figure 2:
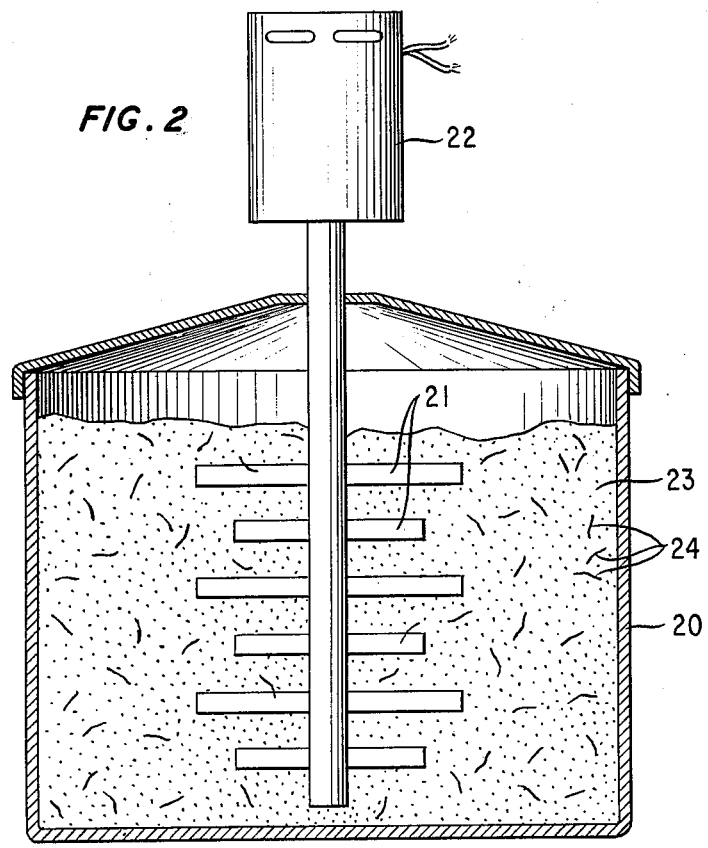
FIG. 2 illustrates the mechanical apparatus used for the liberation step.

FIG. 2 shows a typical apparatus useful for achieving the objective just discussed. The apparatus is an agitating tank of conventional design comprising container 20, impeller 21 and a drive means 22. The medium 23 is, according to the invention, a dry powder. Wire segments are shown at 24.

As indicated earlier, wire separation has been practiced using a liquid as medium 23. The advance recognized here is the use of a dry powder medium, and in particular, a medium that is one of the constituents of the reconstituted plastic composition. Illustrative of the kinds of particulate or powdered substances that are tolerated or intentionally added to plastics in significant quantities are the following:

calcium carbonate, hydrated alumina (e.g., $Al_2O_3 \cdot 3H_2O$), clay, silica, glass, carbon black, talc, asbestos, mica, iron oxide, magnesium carbonate, calcium silicate.

this stage may be too large to incorporate in to the reconstituted plastic. However, it is useful to avoid total separation of the powder from the plastic, as this process allows. Complete separation adds a further step and expense to the process. In order to define this aspect of the process, a limit of at least 0.5% by weight of residual dry powder is imposed on the separated material, and that quantity thereafter becomes an ingredient of the finished plastic material.

The separation technique of the invention was demonstrated under a variety of conditions to establish its usefulness. The general approach use was to charge the agitator with the dry powder and heat the agitator to preheat the powder. Advantageously, the powder is heated to a temperature in the vicinity of the softening point of the plastic insulation. The agitator is then loaded with wire segments in any convenient quantity. Wire segments having conductor gauge sizes of 26 to 22 AWG and segment lengths of from 0.2 to 2 inches have been reclaimed successfully using this method.

After the metal conductors were liberated from the insulation in the agitating equipment, the metal and plastic were separated in each case from most of the powder by sifting through a 40 mesh screen and subsequently the plastic and metal were separated from each other using a gravity flotation method. The mixture was placed in a $KI-H_2O$ solution having a specific gravity of 1.6. The plastic floats and the copper readily sinks. The two fractions were washed, dried and weighed to give the data shown in the following examples. Although flotation was the technique chosen as the separation method used for these demonstrations, it is not at all exclusive for this function and in many cases may not even be optimum. Mechanical gravity separation, i.e., a dry process, may be preferred.

The following data are presented as exemplary.

EXAMPLE 1

Segments of cross-linked PVC wire of 22 A.W.G. cut in approximately ⅜ inches lengths were agitated in Talcum Powder (Fischer Scientific U.S.P. XI, approximately 10 microns diameter) at the temperature and for the time indicated in the following data Table. The percent plastic or metal liberated appears in the last column and is given as an index of the efficacy of the method as practiced under the indicated conditions.

Example 1

| | Wt. of Talc (gm) | Temp. Setting °C | Temp. of Mixture °C | Time of Mixing (min) | Total Weight of Scrap (gm) | PVC Liberated (gm) | Cu + Middlings (gm) | Total PVC (gm) | % PVC or Cu Liberated (%) |
|---|---|---|---|---|---|---|---|---|---|
| 1. | ~250 | 66 | 100–106 | 5 | 28.2538 | .9659 | 27.3268 | 5.8226 | 16.6 |
| 2. | ~250 | 100 | 135 (est.) | 5 | 14.8695 | 1.7928 | 13.1254 | 3.0702 | 58.4 |
| 3. | ~250 | 122 | 145–168 | 5 | 31.9303 | 5.1195 | 26.6302 | 6.5341 | 78.4 |
| 4. | 230 | 149 | 160–178 | 2.5 | 25.0023 | 4.7526 | 20.1928 | 5.1338 | 92.6 |

When the agitation in tank 20 is completed, the mixture is classified on a standard mechanical classifying table, or other appropriate separating apparatus, to remove the metal wire from the mixture. At this point, much of the dry powder medium will normally fall through the screen of the classifier. It is useful to separate the bulk of the dry powder, and recycle it back into the process. This is easily and economically achieved. Moreover, the amount of dry powder in the mixture at

EXAMPLE 2

Electrical wires from 125 pair telephone cable, A.W.G. 26, chopped in lengths approximately ⅜ inches were treated as in Example 1 with the results given below. The dry powder medium consisted of a variety of materials as indicated. In amounts exceeding ½% by weight each is considered to be compatible with a large variety of plastic compositions.

Example 2

Wires only from 125 pair cable, 26 A.W.G., chopped ⅜" in length

|   |   | Wt. of Talc (gm) | Temp. Setting °C | Temp. of Mixture °C | Time of Mixing (min) | Total Weight of Scrap (gm) | PVC Liberated (gm) | Cu + Middlings (gm) | Total PVC (gm) | % PVC or Cu Liberated (%) |
|---|---|---|---|---|---|---|---|---|---|---|
| 5. | Blasting Sand | ~250 | 100 | 135(est.) | 2.5 | 22.9633 | 1.0624 | 21.9009 | 5.8074 | 18.3 |
| 6. | " | ~250 | 100 | " | 5 | 22.6340 | 5.1332 | 16.8878 | 5.5691 | 92.2 |
| 7. | Ground Limestone | ~250 | 100 | " | 5 | 27.2380 | 4.1635 |  | 6.8885 | 60.4 |
| 8. | Omyalite 90-T (CaCO₃) | ~250 | 100 | " | 5 | 18.7787 | 3.9424 | 14.8363 | 4.7491 | 83.0 |
| 9. | 103-EP PVC Resin | 120 | 100 | " | 5 | 26.2153 | 3.4561 | 23.1629 | 6.7319 | 51.4 |
| 10. | Talc | ~250 | 66 | 100–111 | 5 | 17.8512 | .9067 | 17.2271 | 4.5860 | 19.8 |
| 11. | " | ~250 | 100 | " | 5 | 22.7254 | 5.5225 |  | 5.7473 | 96.1 |
| 12. | " | 26 | 100 | " | 2.5 | 26.2678 | 4.3877 | 22.1205 | 6.7031 | 65.4 |
| 13. | " | 2.1 | 100 | " | 5 | 25.9452 | 6.2833 | 19.7419 | 6.5615 | 94.5 |

EXAMPLE 3

Wire scrap generated from random collection of telephone installation and maintenance was run once through a Cumberland Granulator, ⅜ inches screen to produce wire segments of the order of ½ inches or less in length. This scrap included a large amount of textile covered wire, i.e., plastic insulated with a textile (typically cotton) outer jacket. Textiles are separated without difficulty by dry classification or flotation. The liberation procedure was the same as that used in the previous examples. In all cases, the dry powder medium was that described in Example 1.

Example 3

|   |   | Temp. Setting °C | Temp. Mixture °C | Mixing Time (min) | Total Scrap (gm) | Plastic + Textile (gm) | Middlings + Cu (gm) | Cu Liberated (gm) | Middlings (gm) | Cu in Middlings (gm) | Total Cu (gm) | % Liberated Cu % |
|---|---|---|---|---|---|---|---|---|---|---|---|---|
| 14. | PVC Scrap | 100 | 120–130 | 5 | 20.6163 | 8.4144 | 12.4187 | 12.0689 | .3498 | .2798 | 12.3487 | 97.7 |
| 15. | " | 100 | 100<br>107<br>112.5<br>114.5<br>117<br>119 | 0<br>.5<br>1<br>1.5<br>2<br>2.5 | 30.0050 | 12.0355 | 18.4148 | 15.5306 | 2.8842 | 2.3074 | 17.8380 | 87.1 |
| 16. | " | 100 | 100<br>107<br>113<br>118.8<br>123.5<br>127.6 | 0<br>1<br>2<br>3<br>4<br>5 | 30.0059 | 11.9705 | 18.4410 | 15.5474 | 2.8430 | 2.5149 | 17.5623 | 87.0 |
| 17. | " | 121 | 122<br>128<br>132.4<br>136.4<br>134<br>142 | 0<br>.5<br>1<br>1.5<br>2<br>2.5 | 30.0319 | 12.2846 | 18.2431 | 16.7300 | 1.5131 | 1.2105 | 17.9405 | 93.3 |
| 18. | " | 121 | 122<br>129<br>141<br>149<br>153.1<br>155 | 0<br>1<br>2<br>3<br>4<br>5 | 30.0734 | 12.1763 | 18.0729 | 17.7965 | .2764 | .2211 | 18.0176 | 98.8 |
| 19. | " | 135 | 140<br>146<br>151.5<br>155.5<br>159.4<br>162.5 | 0<br>.5<br>1<br>1.5<br>2<br>2.5 | 30.0308 | 12.5353 | 17.8418 | 17.1724 | .6674 | .5355 | 17.7079 | 97.0 |

EXAMPLE 4

The data below were collected using the procedure described in Example 3, except that the scrap was chopped using a Rainville Chopper with a 5/16 inches screen.

Example 4

|   |   | Wts of Medium (gm) | Temp Setting °C | Temp of Mixture °C | Time of Mixing (min) | Weight of Sample (gm) | Wt. of Liberated PVC (gm) | Wt. of Cu + Middlings (gm) | Total PVC (gm) | % PVC or Cu Liberated (%) |
|---|---|---|---|---|---|---|---|---|---|---|
| 20. | Talcum | 230 | 100 | 121.1<br>120.3<br>123.9<br>126.6<br>128.6<br>130.6 | 0<br>.5<br>1<br>1.5<br>2<br>2.5 | 24.9978 | 4.1434 | 20.9047 | 6.3372 | 65.4 |

Example 4-continued

| | Wts of Medium (gm) | Temp Setting °C | Temp of Mixture °C | Time of Mixing (min) | Weight of Sample (gm) | Wt. of Liberated PVC (gm) | Wt. of Cu + Middlings (gm) | Total PVC (gm) | % PVC or Cu Liberated (%) |
|---|---|---|---|---|---|---|---|---|---|
| 21. | " | " | 100 | 130 / 0 | 25.0056 | 5.8065 | 19.1647 | 6.3152 | 91.9 |
| | | | | 131 / .5 | | | | | |
| | | | | 134.5 / 1 | | | | | |
| | | | | 137.2 / 1.5 | | | | | |
| | | | | 139.2 / 2 | | | | | |
| | | | | 140.7 / 2.5 | | | | | |
| 22. | " | " | 121 | 140 / 0 | 25.0142 | 5.9259 | 19.0107 | 6.3050 | 93.9 |
| | | | | 138.6 / .5 | | | | | |
| | | | | 144.1 / 1 | | | | | |
| | | | | 142.8 / 1.5 | | | | | |
| | | | | 144.8 / 2 | | | | | |
| | | | | 146.2 / 2.5 | | | | | |
| 23. | " | " | 135 | 150 / 0 | 24.9957 | 6.1753 | 18.7659 | 6.3076 | 97.5 |
| | | | | 151.4 / .5 | | | | | |
| | | | | 154.5 / 1 | | | | | |
| | | | | 157.4 / 1.5 | | | | | |
| | | | | 160 / 2 | | | | | |
| | | | | 162.4 / 2.5 | | | | | |
| 24. | " | " | 149 | 160 / 0 | 24.9940 | 6.2131 | 18.5414 | 6.2604 | 99.2 |
| | | | | 163 / .5 | | | | | |
| | | | | 167 / 1 | | | | | |
| | | | | 169.4 / 1.5 | | | | | |
| | | | | 172.5 / 2 | | | | | |
| | | | | 174.1 / 2.5 | | | | | |
| 25. | " | " | 149 | 160 / 0 | 24.9907 | 6.2496 | 18.7761 | 6.3240 | 98.7 |
| | | | | 165.7 / .5 | | | | | |
| | | | | 167.3 / 0.75 | | | | | |
| | | | | 168.8 / 1.00 | | | | | |
| | | | | 170.3 / 1.25 | | | | | |
| 26. | " | 50 | 100 | 5 | 24.9974 | 6.1735 | 18.8162 | 6.3199 | 97.7 |
| 27. | Omyalite 90-T (CaCO$_3$) | 230 | 100 | 121.2 / 0 | 25.0006 | 4.1516 | 20.8714 | 6.3284 | 65.6 |
| | | | | 121.9 / .5 | | | | | |
| | | | | 123.2 / 1 | | | | | |
| | | | | 124.3 / 1.5 | | | | | |
| | | | | 124.5 / 2 | | | | | |
| | | | | 125.2 / 2.5 | | | | | |

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. A method for recovering plastic from plastic insulated wire scrap comprising agitating short segments of the wire in a heated dry powder medium until the metal is released from the plastic insulation, separating the metal from the plastic insulation leaving at least 0.5% by weight of the powder intermixed with the plastic insulation.

2. The method of claim 1 in which the dry powder medium is selected from the group consisting of calcium carbonate, hydrated alumina (e.g., $Al_2O_3 \cdot 3H_2O$), clay, silica, glass, carbon black, talc, asbestos, mica, iron oxide, magnesium carbonate, calcium silicate.

3. The method of claim 1 in which the dry powder medium is heated to a temperature exceeding 100°C.

4. In a method for liberating metal conductors from the plastic insulation coating of electrical wire comprising the steps of agitating pieces of the electrical wire in a heated medium to heat the wire pieces and to provide an impact agitating force to the wire pieces to thereby free the metal conductors from the insulation the improvement wherein the heated medium is a dry powder.

5. The method of claim 4 in which the dry powder is selected from the group consisting of calcium carbonate, hydrated alumina (e.g., $Al_2O_3 \cdot 3H_2O$), clay, silica, glass, carbon black, talc, asbestos, mica, iron oxide, magnesium carbonate, calcium silicate.

6. The method of claim 4 in which the medium is heated to a temperature in excess of 100°C.

7. The method of claim 4 in which the dry powder medium is talc.

8. The method of claim 4 in which the dry powder medium comprises calcium carbonate.

9. The method of claim 4 in which the dry powder medium comprises a plastic.

* * * * *